United States Patent
Wylie

(10) Patent No.: US 6,820,428 B2
(45) Date of Patent: Nov. 23, 2004

(54) SUPERCRITICAL COMBINED CYCLE FOR GENERATING ELECTRIC POWER

(75) Inventor: Roger Wylie, Baytown, TX (US)

(73) Assignee: Wylie Inventions Company, Inc., Marble Falls, TX (US)

( * ) Notice: Subject to any disclaimer, the term of this patent is extended or adjusted under 35 U.S.C. 154(b) by 91 days.

(21) Appl. No.: 10/354,830

(22) Filed: Jan. 30, 2003

(65) Prior Publication Data

US 2004/0148941 A1 Aug. 5, 2004

(51) Int. Cl.[7] ................................. F02C 6/18
(52) U.S. Cl. ........................... 60/772; 60/39.182
(58) Field of Search ................. 60/772, 39.182

(56) References Cited

U.S. PATENT DOCUMENTS

| | | | | | |
|---|---|---|---|---|---|
| 1,632,575 | A | * | 6/1927 | Wilhelm | .................... 60/655 |
| 6,065,283 | A | * | 5/2000 | Shouman | ................ 60/39.182 |
| 6,173,679 | B1 | * | 1/2001 | Bruckner et al. | ........ 122/406.4 |
| 6,244,033 | B1 | * | 6/2001 | Wylie | ...................... 60/39.182 |
| 6,751,959 | B1 | * | 6/2004 | McClanahan et al. | ........ 60/670 |

* cited by examiner

Primary Examiner—Michael Koczo
(74) Attorney, Agent, or Firm—Murray Nadler

(57) ABSTRACT

A combined cycle process for generating electric power wherein the working fluid fed to the steam turbine train is water above its critical pressure and temperature.

Preferred embodiments include: reheating steam side streams extracted from the steam turbine train in the heat recovery unit and feeding the reheated steam side streams back into the steam turbine train; firing supplemental fuel gas in the gas turbine exhaust gas stream flowing through the heat recovery unit at one or more points to increase the power output of the steam turbine train; and diverting part of the condensate stream around the economizer tubes in the heat recovery unit to a separate heat exchanger where the diverted condensate stream is heated with steam side streams extracted from the steam turbine train.

10 Claims, 10 Drawing Sheets

SUPERCRITICAL COMBINED CYCLE FOR GENERATING ELECTRIC POWER

FIELD OF THE INVENTION

This invention relates to generation of electric power in stationary power plants.

BACKGROUND OF THE INVENTION

Combined cycle systems are comprised of

1) One or more gas turbines each driving an electric power generator;

2) A steam turbine train comprised of two or more steam driven turbines piped for series steam flow and turning a common drive shaft that drives an electric power generator, and 3) A heat recovery unit in which heat in the combined gas turbine combustion exhaust gas stream is transferred to the steam turbine working fluid.

The gas turbines are fired with a fossil fuel gas, usually natural gas. Synthetic natural gas and low BTU gas are also suitable fuels for the gas turbines.

Currently, combined cycle units are designed so that the power generated by the gas turbines is about twice the power generated by the steam turbine train.

Combined cycle units usually have capability to fire fuel gas in the heat recovery unit. This feature is termed supplemental firing. Firing fuel gas in the heat recovery unit provides additional heat that is used to increase water working fluid circulation rate to increase power output from the steam turbine train. Fuel gas is injected directly into the gas turbine combustion exhaust gas stream in the heat recovery unit, usually close to the gas turbine exhaust gas inlet to the heat recovery unit. The gas turbine exhaust gas streams contain sufficient residual unburned oxygen to support combustion of the fuel gas.

The efficiency of fuel gas fired supplementally to generate incremental power is less than the efficiency of fuel gas fired in the gas turbines to generate base load power. Accordingly, supplemental firing is practiced usually during periods of peak power demand, when power prices are high.

Supplemental firing in the heat recovery unit is also practiced when the heat available in the turbine gas stream is not adequate to provide all the heat required to raise the temperature of the water working fluid stream to the specified steam turbine train inlet temperature. The combustion air feed rate to a gas turbine required for it to operate properly varies with ambient air conditions and, accordingly, so does the sensible heat in the combustion gas exhaust streams that is available for transfer to the water working fluid in the heat recovery unit.

Combined cycles have displaced traditional power units comprised of a steam boiler feeding a steam turbine-generator unit for base load power generation. This has occurred because technical improvements to gas turbines have significantly increased their generation capacity and fuel efficiency and reduced their investment and operating costs.

The pressure of steam generated in the heat recovery unit and fed to the inlet to the steam turbine train in current combined cycle units is typically in the range of 1000 psia to 1500 psia, which is well below the critical pressure of water, 3206.2 psia. However, in the process of the present invention the pressure of the water working fluid stream produced in the heat recovery unit and fed to the inlet of the steam turbine train is above the critical pressure of water. The water working fluid going to the steam turbine train is also above the critical temperature of water, 705.4 F. Accordingly the combined cycles of the present invention are termed Super Critical Combined Cycles.

Super critical combined cycles of the present invention have several advantages over conventional sub critical combined cycles. These advantages include simpler heat recovery units, capability to generate more incremental power by firing fuel gas in the heat recovery unit efficiently, capability to vary power output quickly to accommodate to changing power demand, higher fuel efficiency, and reduced air pollutant emissions.

The power output of the steam turbine train in super critical combined cycles of the present invention can be increased by a factor of up to 10× by supplemental firing. Increasing power output by increments of this magnitude is not cost effective with sub critical combined cycles. Of course, the water working fluid circulation system, steam turbines, and generator must be designed to meet the peak rate operating duty experienced when supplementally firing fuel gas at maximum rate. This extra steam train capacity over the base load capacity is idle when supplemental firing is not employed, and therefore adds to the cost of the incremental power produced by supplementary firing. The efficiency of steam turbines does not vary significantly over the one to ten power output range.

Currently it is common practice to fire all of the supplementary fuel near the inlet to the heat recovery unit. This raises the gas temperature near the gas inlet to very high values, up to 2000 F. High gas temperatures induce formation of atmospheric pollutants and accelerate corrosion of heat exchanger tubes in the heat recovery unit. Embodiments of the present inject the supplementary fuel gas into the heat recovery unit at multiple selected points to reduce temperature peaks.

The fuel requirements of super critical combined cycles are generally marginally higher than for sub critical combined cycles because working fluid pressure and temperatures to the steam turbine train are higher. But the more significant efficiency advantage of super critical combined cycles arise because super critical combined cycles are amenable to and benefit more from certain fuel saving design options that are not practical with sub critical combined cycles. These design options reheat of steam side streams extracted from the steam turbine train and preheat of recycled condensate by steam side streams extracted from the steam turbine train, The power output of super critical combined cycles of the present invention can be varied up and down much more quickly (with less time lag) to respond to changing power demand requirements than can conventional sub critical combined cycles. Operators value this flexibility of super critical combined cycles to adapt to changing power demand.

The flexibility advantage of super critical combined cycles derives ultimately from the physics of super critical fluids. When water that is below its critical pressure is heated to form steam it exhibits all the usual physical phenomena associated with boiling phase change. Condensate temperature rises to the saturation temperature, the condensate boils at constant temperature to form saturated steam consuming latent heat of vaporization, and then the saturated steam is superheated. When water that is above its critical pressure is heated it behaves differently from sub critical pressure water.

The temperature of water above its critical pressure increases steadily and smoothly with no discontinuities due to phase change from condensate inlet temperature which is typically between about 100 F to 200 F to the turbine train inlet temperature which is typically about 1000 F. About 40% of the heat transferred to the super critical water working fluid is absorbed as the condensate stream is heated from 100 F to 600 F (0.080% per degree F.). About 45% of the heat transferred is absorbed between 600 F and 800 F (0.225% per degree F.). And about 15% of the heat is absorbed between 800 F and 1000 F (0.075% per degree F.). The enthalpy-temperature curve of super critical water exhibits an inflection point near its critical state point.

Accordingly, super critical combined cycle unit do not require a steam heads drum to separate saturated steam from boiling water whereas sub critical combined cycles do require a large steam heads drum. The steam heads drum contains a large quantity of liquid water hold up. This water hold up induces long temperature response time lags when boiler feed water circulation rate is changed to raise or lower the power output of the steam turbine train in sub critical combined cycles.

The overall fuel efficiency of a fossil fuel fired power unit or station is expressed as a heat rate: BTU's (British Thermal Units) released by total combustion of the fuel divided by the net kilowatt-hours of power produced using that released heat, BTU's/KWH. There are two ways to express the heat content of a fuel when computing heat rate: the lower heating value and higher heating value. The lower heating value (LHV) of the fuel is measured with the water in the combustion product stream formed by oxidation of hydrogen in the fuel not condensing and not giving up its heat of vaporization. The higher heating value (HHV) is measured with the water vapor condensing and giving up its heat of vaporization. Heat rates herein are computed using the lower heating value of fuel. Operators strive to minimize heat rate for the unit or station to reduce fuel costs and atmospheric pollutants emitted to the atmosphere.

SUMMARY OF INVENTION

The present invention comprises combined cycles wherein the pressure and temperature of the water working fluid for the steam turbine train exiting the heat recovery unit is above the critical pressure of water, which is 3206.2 psia and the critical temperature of water which is 705.4 F.

In one preferred embodiment of the super critical combined cycles of the present invention steam side streams are extracted from the steam turbine train, reheated in the heat recovery unit with sensible heat transferred from the gas turbine exhaust gas, and fed back into the steam turbine train.

In another preferred embodiment of the super critical combined cycles of the present invention a fuel gas is fired in the heat recovery unit to supplement the sensible heat in the turbine gas stream to heat working fluid for the steam turbine train. The supplemental heat released is used to increase the working fluid flow rate to the steam turbine, which increases the power output of the steam turbine train generator.

In some embodiments fuel gas is injected into the gas turbine exhaust gas stream several points in the gas stream as it flows through the heat recovery unit. One of the points is usually near the gas inlet to the heat recovery unit.

In another embodiment of the super critical combined cycles of the present invention part of the condensate stream is bypassed around the economizer tubes in the heat recovery unit and is heated in heat exchangers external to the heat recovery unit. The heat sources are steam side streams extracted from the turbine train. The diverted and preheated condensate stream is fed into the primary heating tubes in the heat recovery unit where it joins the main condensate stream that has been heated in the economizer tubes.

In the interest of clarity, pumps, heat exchangers, control valves, control systems, and auxiliary equipment items that are necessary for a practical and safe operating unit have intentionally been left out of the figures if they are not required to elucidate the inventive concepts. These deletions are generally understood by those skilled in the art and do not limit the scope of the invention.

The figures show only a few of the many possible embodiments of the present invention. Skilled process engineers will recognize that many other versions and variants of the present invention can be devised.

DESCRIPTIONS OF SUPER CRITICAL COMBINED CYCLES OF THE PRESENT INVENTION

Super critical combined cycles of the present invention all include:

One or more gas turbines each driving an electric generator;

A steam turbine train comprised of one or more steam turbines piped so that the steam stream flows through the turbines in the train in series flow. The steam turbines in the train drive an electric generator via a common drive shaft;

A heat recovery unit in which sensible heat is transferred from the combined gas turbine combustion exhaust gas streams to the water working fluid by flowing over tubes through which the water working fluid is pumped;

The water working fluid that exits the heat recovery unit and is fed into the inlet of the steam turbine train is at a pressure that is above the critical pressure of water, 3206.2 psia, and above the critical temperature of water, 705.4 F.

Figure 1:
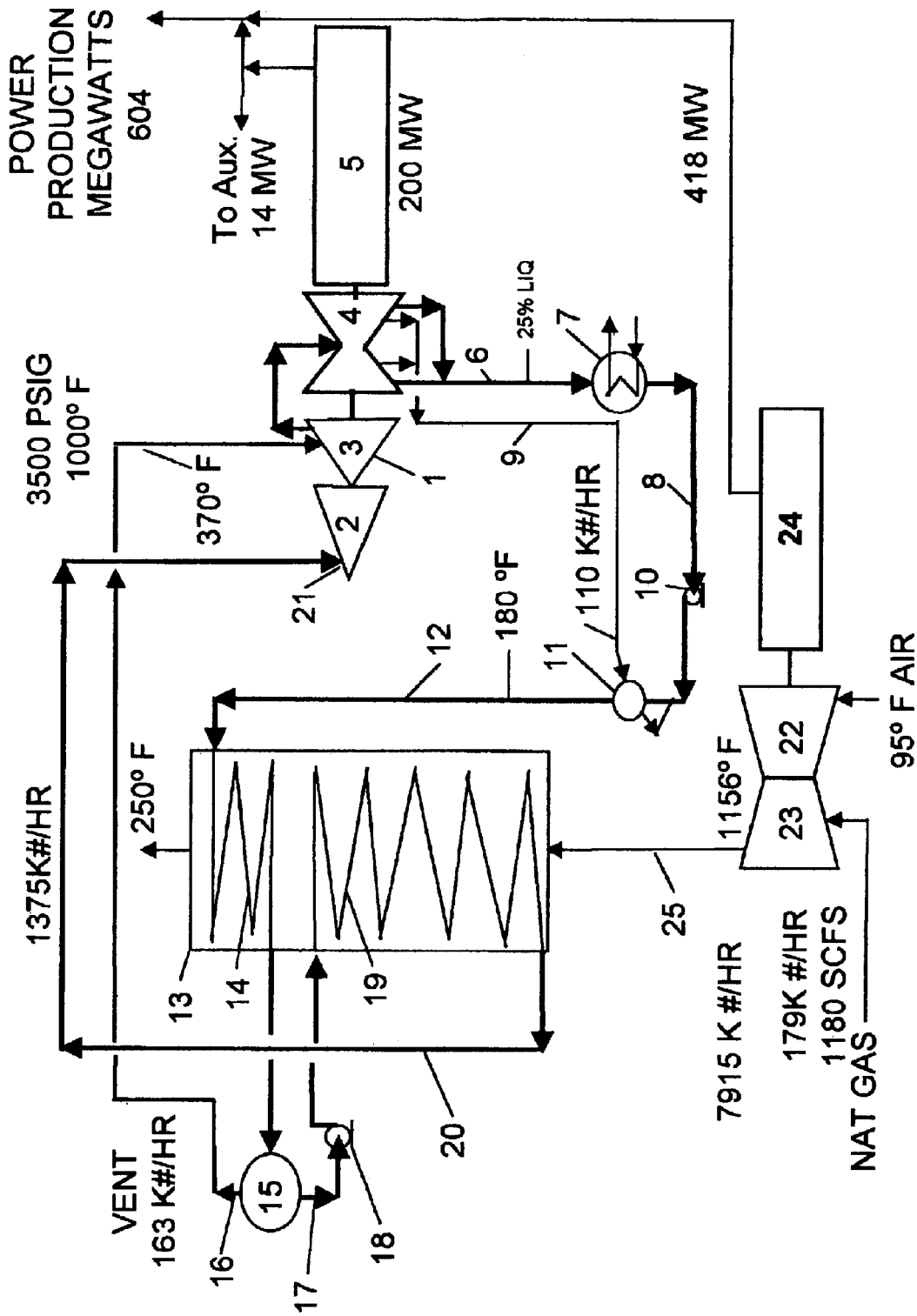
FIG. 1 is a simplified process flow diagram of the embodiment of the super critical combined cycle of the present invention in its most basic form: ex steam side stream reheat, supplemental fuel gas firing in the heat recovery unit, and condensate bypass and preheat around the economizer tubes. Key flow rates and state point conditions are marked on FIG. 1.

FIG. 1 is a process flow diagram for an embodiment of the super critical combined cycle of the present invention in its most basic form. The process is used to generate continuous base load power.

The steam turbine train 1 of FIG. 1 consists of three steam turbines: a high pressure non-condensing steam turbine 2, an intermediate pressure non-condensing steam turbine 3, and a low pressure split flow condensing turbine 4. The steam turbines turn a common drive shaft that drives an electric power generator 5. The water working fluid stream enters the upstream high pressure steam turbine and flows in series through the three steam turbines losing pressure and temperature as it moves downstream through the steam turbines, producing the shaft work that drives the electric generator on the steam turbine train shaft.

Exhaust steam 6 from the downstream low pressure turbine 4 is condensed against cooling water or air in the condenser 7 to form the condensate stream 8. Typically the condenser 7 cools the condensate to about 100 F which induces a vacuum of about 3.5 inches of mercury absolute pressure in the condenser.

The condensate stream 8 is pumped 10 through condensate preheaters 11 that use steam 9 extracted from the low pressure steam turbine 4 in the steam turbine train 1 as the heat source. The preheated condensate stream 12 is conveyed into the economizer tubes 14 in the top section of the heat recovery unit 13. The condensate stream has to be preheated to a temperature that is high enough to preclude condensation of water on the external surfaces of the economizer heating tubes where the turbine exhaust gas has been cooled to 250 F to 300 F. Preheating the condensate stream to a temperature in the range of 170 F to 175 suffices.

The temperature of the working fluid stream is raised to about 370 F in the economizer tubes 14. From the economizer tubes the water working fluid stream flows to the de-aerator vent drum 15 where a small vapor stream 16 is withdrawn overhead to expel air that has unavoidably leaked into the working fluid in the condenser 7 because the condenser operates under vacuum. The vent gas 16 is conveyed into the intermediate pressure turbine 3 at an appropriate point.

The de-aerated water working fluid stream 17 is withdrawn from the vent drum and is compressed to between about 3700 to 4000 psig (which is above the critical pressure of water, 3206.2 psia) using the working fluid pump 18. The compressed water stream is conveyed to the primary heating tubes 19 in the heat recovery unit where the water stream is heated to about 1000 F, which is above the critical temperature of water, 705.4 F. The super critical water working fluid stream 20 is conveyed into the entrance port 21 of the high pressure steam turbine 2.

The water working fluid stream flows through the steam turbine train 1 losing pressure and temperature as it flows downstream, producing shaft work that drives the steam turbine train electric generator 5.

The process of FIG. 1 includes two Westinghouse 501G gas turbine generators 22 each producing about 210 MW of electric power when drawing combustion air at summer ambient conditions of 95 F. Each gas turbine is fired with 595 SCFS of natural gas. The turbo compressors 23 compress 15,150 cubic feet per second of combustion air to about 200 psig. The natural gas stream burns in the turbines at about 2200 F and the combustion gas stream exits the gas turbine at about 1150 F. The gas turbines each drive a generator 24 that produces 209 MW of power.

The combustion exhaust gas streams from the gas turbines are combined 25 and conveyed into the heat recovery unit 13 where sensible heat in the gas stream is transferred to the water working fluid stream. The gas turbine exhaust gas stream flows up through the heat recovery unit, first over the primary working fluid heating tubes 19, and then over the economizer tubes 14. The water working fluid flows first through the economizer tubes 14 and then through the primary tubes 19. The cooled turbine gas stream 25 flows up an exhaust stack (not shown) and is released into the atmosphere.

The primary heating tubes 19 and the economizer tubes 14 are manifolded in the heat recovery unit for multi-pass flow: two pass flow is the most common configuration. Also, the tubes are externally finned to increase gas side heat transfer rate. Baffles are mounted in the gas space of the heat recovery unit to induce the gas turbine exhaust gas stream to flow counter currently flow to the working fluid flowing in the tubes.

The two gas turbine generators 24 produce about 418 MW of power. The steam turbine generator produces 5 about 200 MW. The auxiliary equipment consumes about 14 MW. Therefore, the net power output of the system is about 604 MW. The cycle heat rate is about 6380 BTU per KWH (LHV). The heat rate of a comparable super critical steam turbine generator unit is about 9,000 BTU/KWH (LHV). Accordingly, the super critical combined cycle of FIG. 1 consumes about 30% less fuel than a comparable conventional boiler/steam turbine power plant unit.

Figure 2:
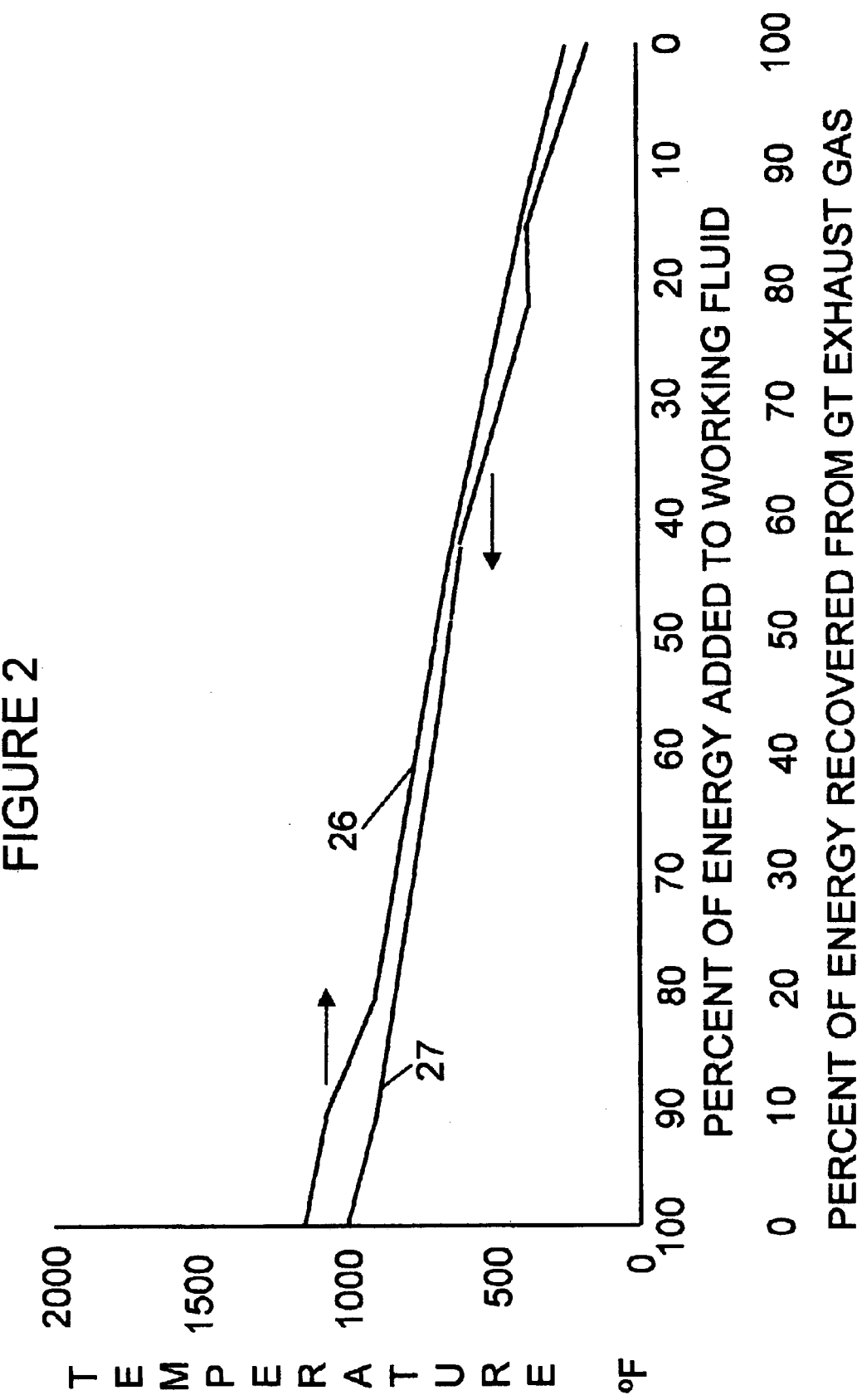
FIG. 2 presents the cooling curve for the gas turbine exhaust gas stream and the heating curve for the condensate stream flowing through the heat recovery unit for the process of FIG. 1. The curves are plots of temperature of the stream versus percent of the total sensible heat that is transferred from the turbine gas stream to the condensate, assuming counter current flow.

FIG. 2 contains the cooling curve 26 for the gas turbine exhaust gas in the heat recovery unit corresponding to Example 1 and the heating curve for the steam turbine water working fluid stream 27. The coordinates are stream temperatures vs. percentage of total sensible heat transferred from the turbine gas stream to the working fluid stream.

The gas turbine exhaust gas stream flows up through the heat recovery unit, first over the primary heat exchange tubes and then over the economizer tubes, counter currently to the flow of the working fluid streams flowing in the tubes. The gas stream temperature decreases and the working fluid temperature increases. The points where the gas stream temperature gets close to the working fluid temperature are called "pinch points". Pinch points reduce the log mean temperature difference driving force for heat transfer in the heat recovery unit, which impairs heat transfer from the gas turbine exhaust gas to the working fluid in the heat recovery unit. FIG. 2 indicates that for the process of FIG. 1 the streams are closely pinched in the heat recovery unit throughout.

In the December, 2001 issue of Hydrocarbon Processing magazine an article by V. Ganapathy (which is incorporated herein by reference) recommends that the pinch point approach temperature differentials in a heat recovery unit with inlet turbine gas exhaust temperatures over 1200 F not be less than about 40 F to 70 F. As the pinch point approach temperature differentials fall below about 40 F, heat transfer from the gas stream to the working fluid streams is reduced so that recovery of available sensible heat in the hot gas turbine exhaust gas stream is reduced and the temperature of the gas stream leaving the heat recovery is above the 250 F to 300 F target for full practical sensible heat recovery.

The gas stream mass flow rate is 7910 K lbs per hour, and the working fluid flow rate is 1230 K lbs per hour. The temperature differential between the turbine gas stream and the water working fluid streams at the pinch point is 40 F and it occurs in the zone where the working fluid temperature is between about 500 F and 600 F. In this zone about 65 to 75% of the available sensible heat in the gas turbine gas stream has been transferred from the turbine gas stream to the water working fluid streams. The 40 F temperature differential at the pinch point limits the temperature reduction of the gas stream at the gas outlet from the heat recovery unit to 264 F. Accordingly, the sensible heat recovery is somewhat less than optimum.

Figure 3:
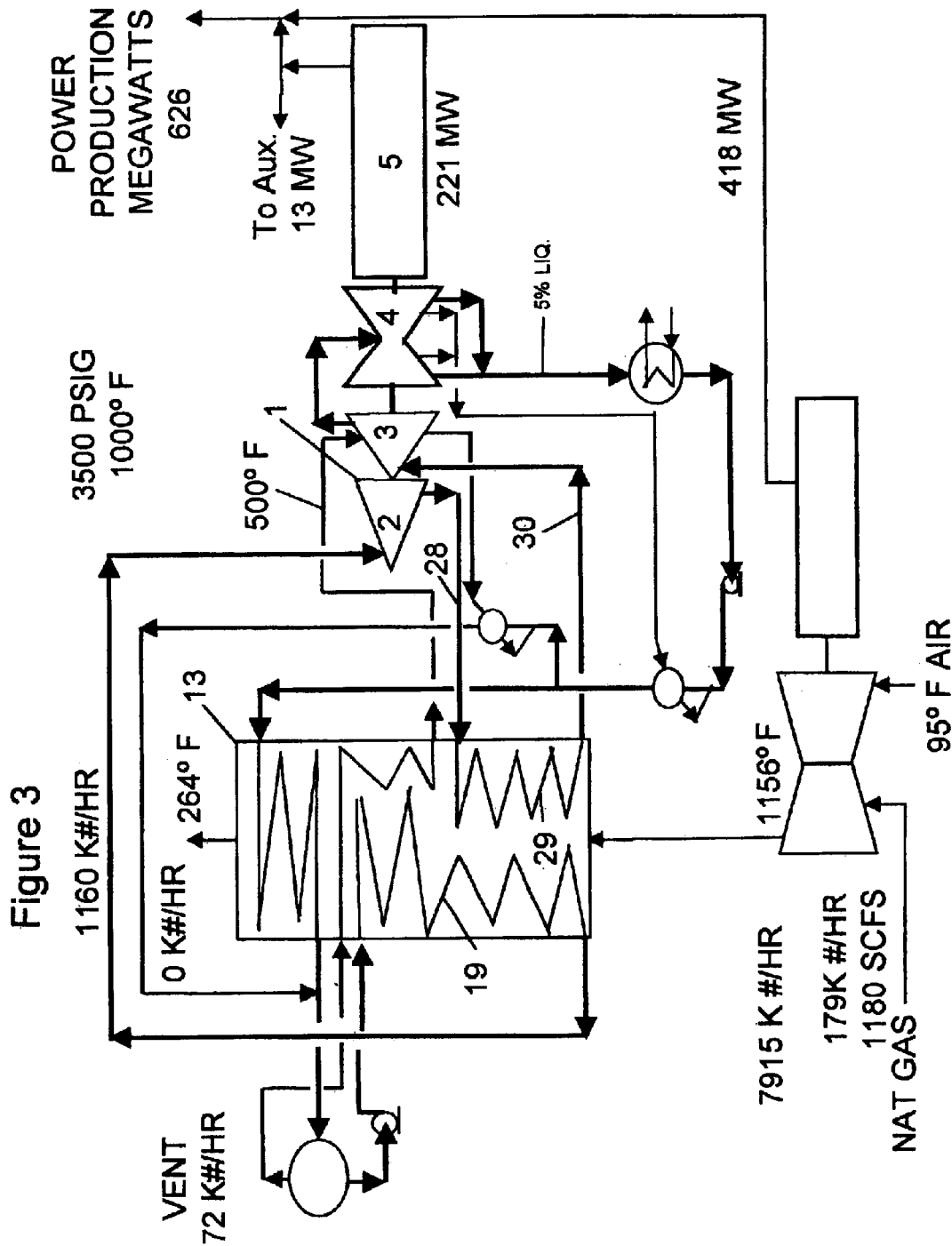
FIG. 3 is a simplified process flow diagram of the embodiment of the super critical combined cycle of the present invention that includes reheat of steam side streams extracted from the steam turbine train. The process does not include supplemental firing in the heat recovery unit and condensate bypass and preheat around the economizer tubes. Key flow rates and state point conditions are marked on FIG. 3.

FIG. 3 is the process of FIG. 1 with reheat of a steam side stream superimposed. A steam side stream 28 of about 1160 k lbs per hour at 450 psia and 480 F is extracted from the low pressure turbine 2 and reheated to 1000 F in the reheat tubes 29 heat recovery unit 13. The reheated stream 30 is fed back into the intermediate pressure turbine 3 in the steam turbine train 1. The reheat tubes 29 are installed in the heat recovery unit 13 such that turbine exhaust gas stream flows over the reheat tubes 29 in parallel with the primary tubes 19 at high temperatures and then flows over the economizer tubes 14 at reduced temperatures.

Adding the steam side stream reheat raises the power output of the steam turbine train generator 5 from 200 MW to 221 MW. The heat rate of the cycle improves from 6380 BTU/KWH (LHV) to 6100 BTU/KWH.

Figure 4:
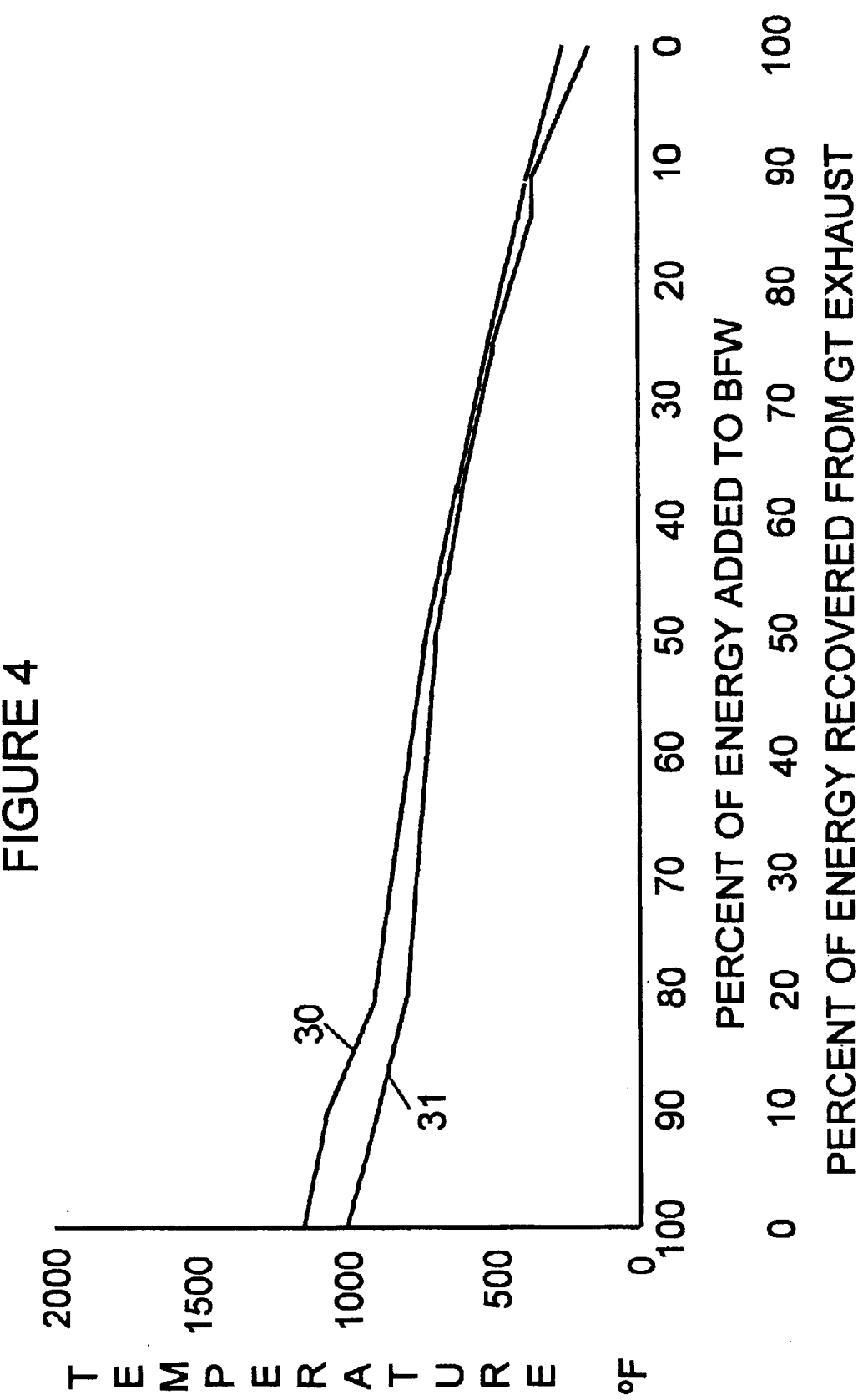
FIG. 4 presents the heat recovery unit heating and cooling curves for the process of FIG. 3.

FIG. 4 presents the gas cooling curve 30 and the working fluid heating curve 31 in the heat recovery unit for the process of FIG. 3. There is a close approach pinch point at about 500 F where about 60% of the recovered sensible heat has been transferred from the gas stream to the working fluid stream. The close pinch point approach temperature differential limits recovery of sensible heat from the turbine gas stream to the working fluid cooling the turbine gas stream as indicated by the moderately high gas outlet temperature of about 270 F.

Figure 5:
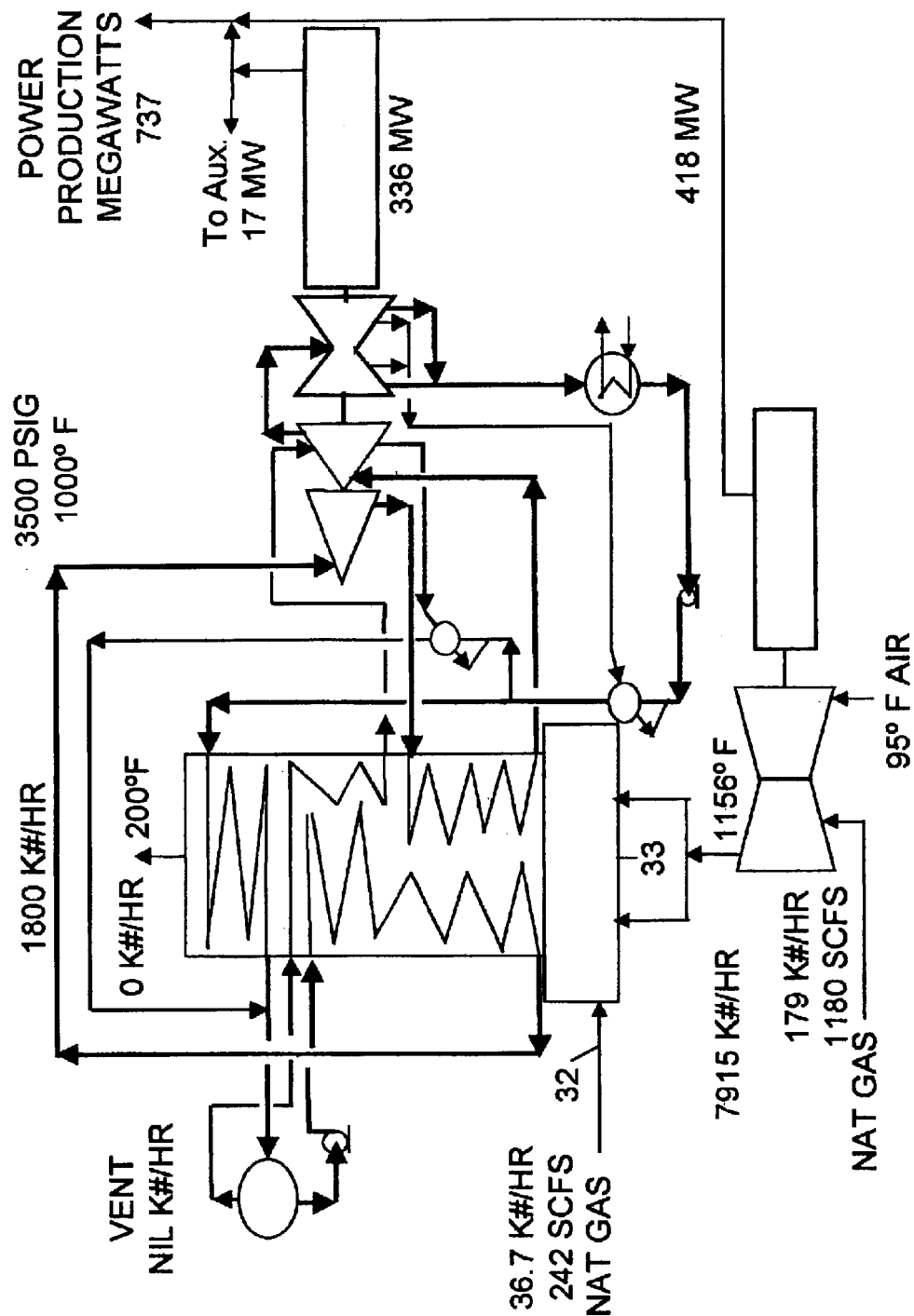
FIG. 5 is a simplified flow diagram of the embodiment of the super critical combined cycle of the present invention that includes reheat of steam side streams from the steam turbine train and supplemental fuel gas firing at the gas entrance to the heat recovery unit. The process does not include condensate bypass and preheat around the economizer tubes.

The process FIG. 5 adds supplemental firing of 242 SCFS of fuel gas 32 in the heat recovery unit to the process of FIG. 3. Sufficient supplemental fuel gas must be fired in the heat recovery unit to achieve the super critical temperature specified for water working fluid at exiting the heat recovery unit. The supplemental fuel gas is all fired near the entrance to the heat recovery unit 33. The residual oxygen content of the gas turbine combustion exhaust gas streams is 12 volume % which is sufficient to support combustion of the supplemental fuel gas.

With supplemental firing the water working fluid circulation rate is increased from 1,160,000 lbs per hour in the process of FIG. 3 to 1,800,000 lbs per hour in the process of FIG. 5. The power output of the steam turbine train generator 5 increases to 336 MW, which is 115 MW more power than the output of the steam train generator 5 in the process of FIG. 3.

The heat rate of the incremental 115 MW is 7100 BTU/KWH (LHV). This is less fuel efficient than the base heat rate of 6100 BTU/KWH (LHV) for the cycle of FIG. 3. Accordingly, supplemental firing is practiced usually only intermittently during periods of peak power demand. The total net power output of the FIG. 5 cycle is 737 KWH produced at a heat rate of 6250 BTU/KWH (LHV).

Figure 6:
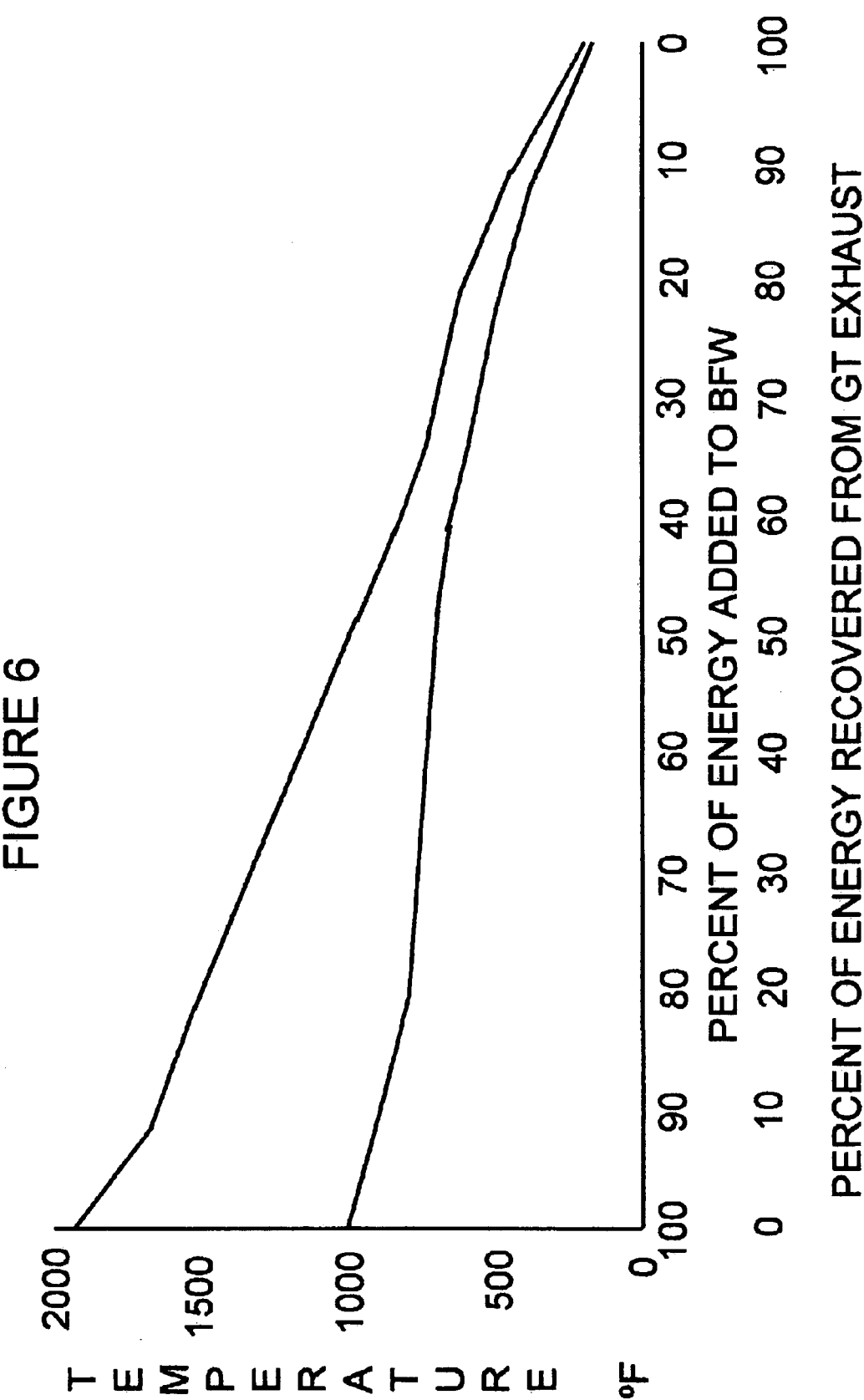
FIG. 6 presents the heat recovery unit heating and cooling curves for the process of FIG. 5.

FIG. 6 presents the cooling curve for the turbine gas stream 34 and heating curve for the primary working fluid working fluid stream 35 in the heat recovery unit for the process of FIG. 5. The temperature of the gas stream near the gas entrance to the heat recovery unit increases from 1156 F in the process of FIG. 3 to about 1500 F in the process of FIG. 5 due to firing fuel gas at the gas entrance to the heat recovery unit.

Comparing FIGS. 4 and 6, it is apparent that supplemental fuel gas firing raises the log mean temperature differential between the gas stream and the working fluid stream in the heat recovery unit. This enhances heat transfer rate and increases recovery of sensible heat from the gas stream e.g. the gas stream exits the heat recovery unit at low temperature, about 200 F.

When supplementary fuel gas is fired in the heat recovery and water working fluid circulation rate is increased, it is usually the case that the increased water working fluid circulation rate flowing through the economizer tubes in the heat recovery unit is higher than is required to recover sensible heat from the gas stream. This opens an opportunity for significantly increasing the fuel efficiency and power output of the cycles with supplementary firing.

The efficiency increase is accomplished by diverting part of the preheated condensate stream away from the economizer tubes and into a condensate heater that is heated with steam side streams extracted from appropriate points on the steam turbine train. Typically, up to 20% to 25% of the circulating working fluid circulation can be diverted around the economizer tubes without impairing sensible heat recovery from the gas turbine exhaust gas. In the condensate heater the diverted condensate stream is heated to a temperature which is close to the temperature of the main condensate stream at the exit from the economizer, a temperature in the range of 300 F to 500 F.

Figure 7:
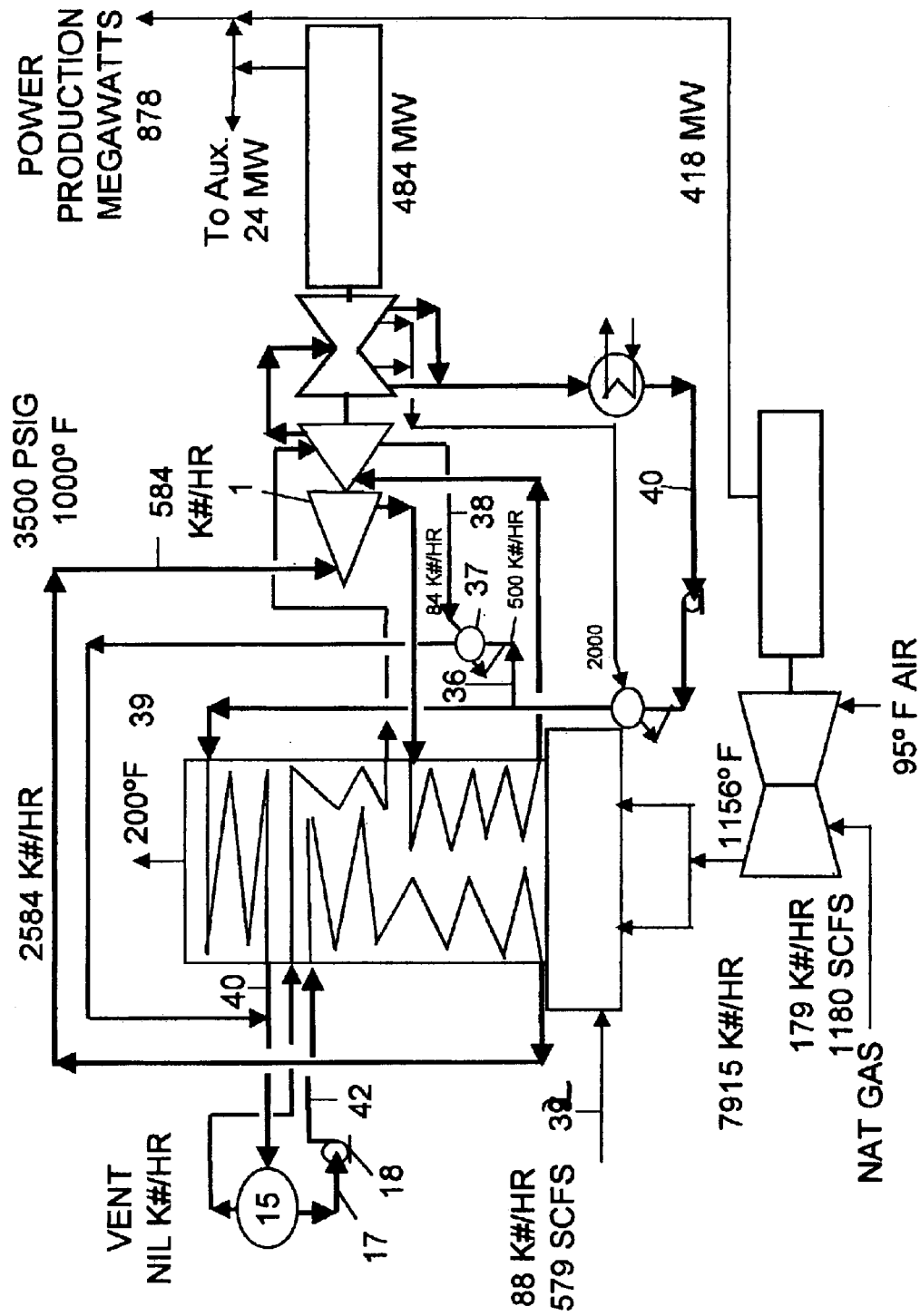
FIG. 7 is a simplified process flow diagram of an embodiment of the super critical combined cycle of the present invention that includes reheat of steam side streams extracted from the steam turbine train, supplemental firing of fuel gas near the gas entrance to the heat recovery unit, and diversion of part of the preheated condensate stream around the economizer tubes in the heat recovery unit. Key state points and flow rates are marked on FIG. 7.

In the process of FIG. 7 the process of FIG. 5 is modified so that about 500,000 lbs per hour of condensate 36 that has been preheated to 175 F in the first preheater (out of the total condensate circulation rate of 2,584,000 lbs per hour) is diverted away from the economizer tubes 14 to a condensate heater 37 where the diverted condensate stream is heated to 370 F with steam side streams 38 extracted from the steam turbine train 1. The diverted heated condensate stream 39 is conveyed from the bypass heater to the de-aerator drum 15 where it is combined with the main preheated condensate stream 40 that has passed through the economizer tubes and has also been heated to about 370 F. The combined condensate stream 41 is compressed to 4000 psig 42 (which is above the critical pressure of water) with a pump 18 and is conveyed into the primary heat exchange tubes 19 in the heat recovery unit 13.

The condensate heater 37 in FIG. 7 is actually a train of four heat exchangers in series. The heat sources for the bypass preheaters are steam streams 38 extracted from the steam turbine train at appropriate points. The steam side stream extraction point for a particular pre-heater is selected so that the side stream steam temperature is sufficiently higher than the working fluid outlet temperature from that exchanger to provide an effective log mean temperature difference for cost effective heat transfer—say 40 F to 50 F LMTD.

The supplemental fuel gas firing rate in the heat recovery unit of FIG. 7 32 is 579 SCFS compared to 242 SCFS in the process of FIG. 5, and the condensate circulation rate 40 is increased to 2,584 K lbs/hr in FIG. 7 from 1,800 K lbs/hr in FIG. 5. The steam turbine generator power output in the process of FIG. 7 is 484 KW compared to 336 KW for the process of FIG. 5. The net power output of the cycle of FIG. 7 is 878 KW produced at a heat rate of 6,530 BTU/KWH (LHV) vs. 737 KW produced at a heat rate 6250 BTU/KWH (LHV) in the cycle of FIG. 5.

Figure 8:
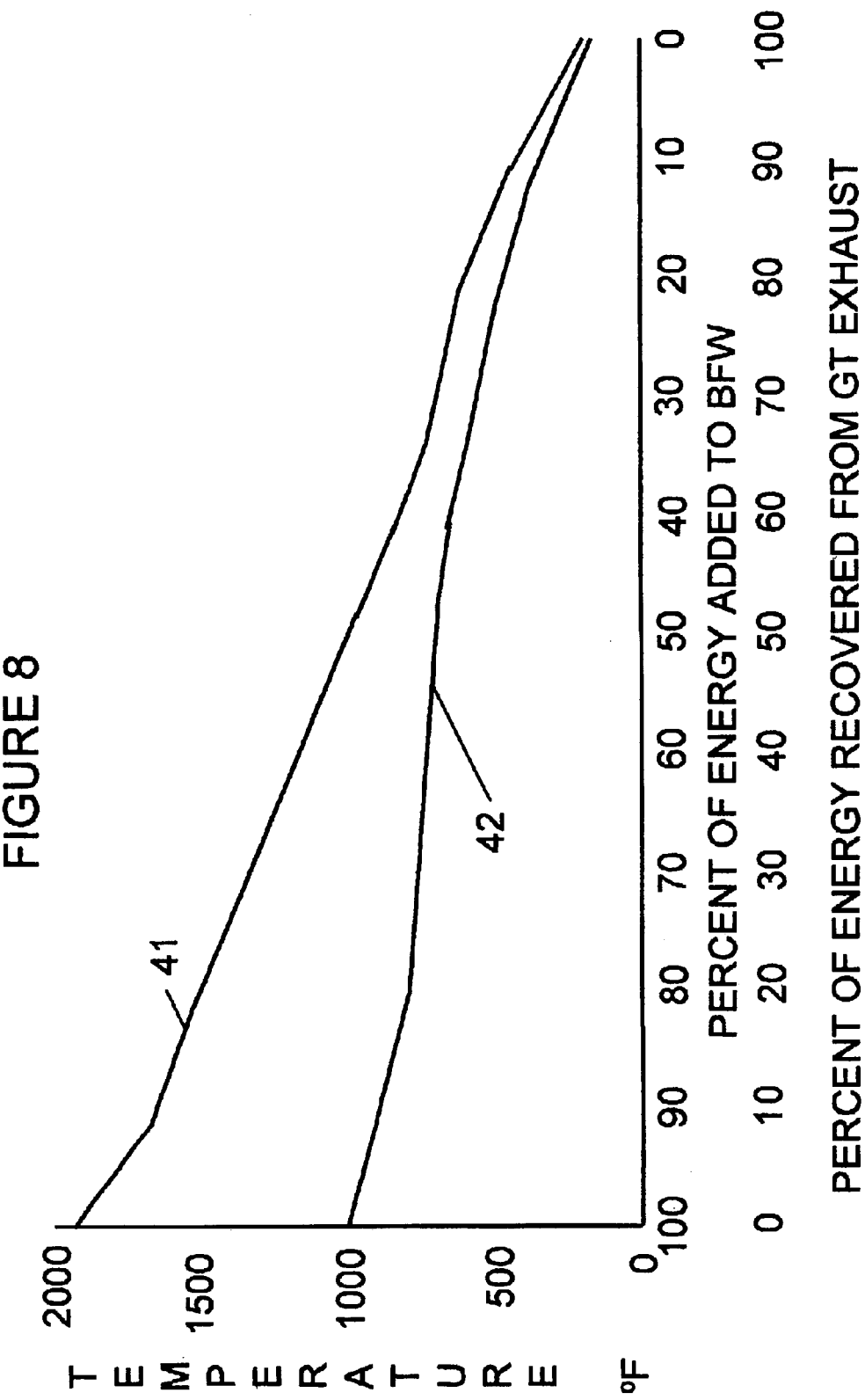
FIG. 8 presents the heating and cooling curves for the process of FIG. 7.

FIG. 8 presents the gas cooling curve 41 and the water working fluid heating curve 42 for the process of FIG. 7. Gas temperature rises to about 2000 F at the gas inlet to the heat recovery unit near where the supplementary fuel gas is fired. There are no pinch points in the heat recovery unit and the gas stream exits the heat recovery unit at about 200 F indicating that full practical sensible heat recovery has been achieved.

The relative positions of the turbine gas cooling curve and the water working fluid heating curve in the economizer section of the heat recovery unit for the process of FIG. 7, shown in FIG. 8, are determined by the ratio of the mass flow rate of the gas stream to the mass flow rate of the working fluid stream in the economizer section. Bypassing condensate around the economizer tubes reduces this mass flow ratio which brings the two curves closer together. This reduces LMTD and therefore heat transfer rate. As a general rule heat transfer is adequate if the ratio of the mass flow rates of turbine gas to working fluid over the economizer tubes is below about 4.3. This critical 4.3 ratio varies somewhat as condensate preheat temperature and gas turbine exhaust gas stream outlet temperature varies. But in general, to achieve viable commercial operation of the super critical combined cycles using the process of FIG. 7, it is a good rule of thumb that the mass flow ratio of the turbine exhaust gas stream to the water working fluid stream should be above about 4.3. Accordingly, the fraction of the circulating condensate that is diverted away from the economizer tubes is limited so that gas to liquid mass flow ration in the economizer section is above about 4.3.

Firing all the supplemental fuel gas near the gas turbine exhaust gas stream entrance to the heat recovery unit as in the process of FIG. 7 raises the gas stream peak temperature in the heat recovery unit at the gas entrance to the heat recovery unit to 1900 F and higher. Such high temperatures in the heat recovery unit increase generation of NOX and other air pollutants in the gas stream vented to the atmosphere and accelerate heat exchange tube failures.

Peak gas temperatures can be reduced by firing the supplemental fuel gas at multiple points in the heat recovery unit rather than firing it all near the gas inlet to the heat recovery unit. Multi-point supplemental firing can be accomplished using one or more small bore fuel tube lines into the heat recovery unit delivering fuel gas to the specified injection points. Burner nozzles of conventional design can installed on the tubes at the fuel injection points to distribute the fuel uniformly into the turbine gas stream and to complete combustion of the fuel.

Figure 9:
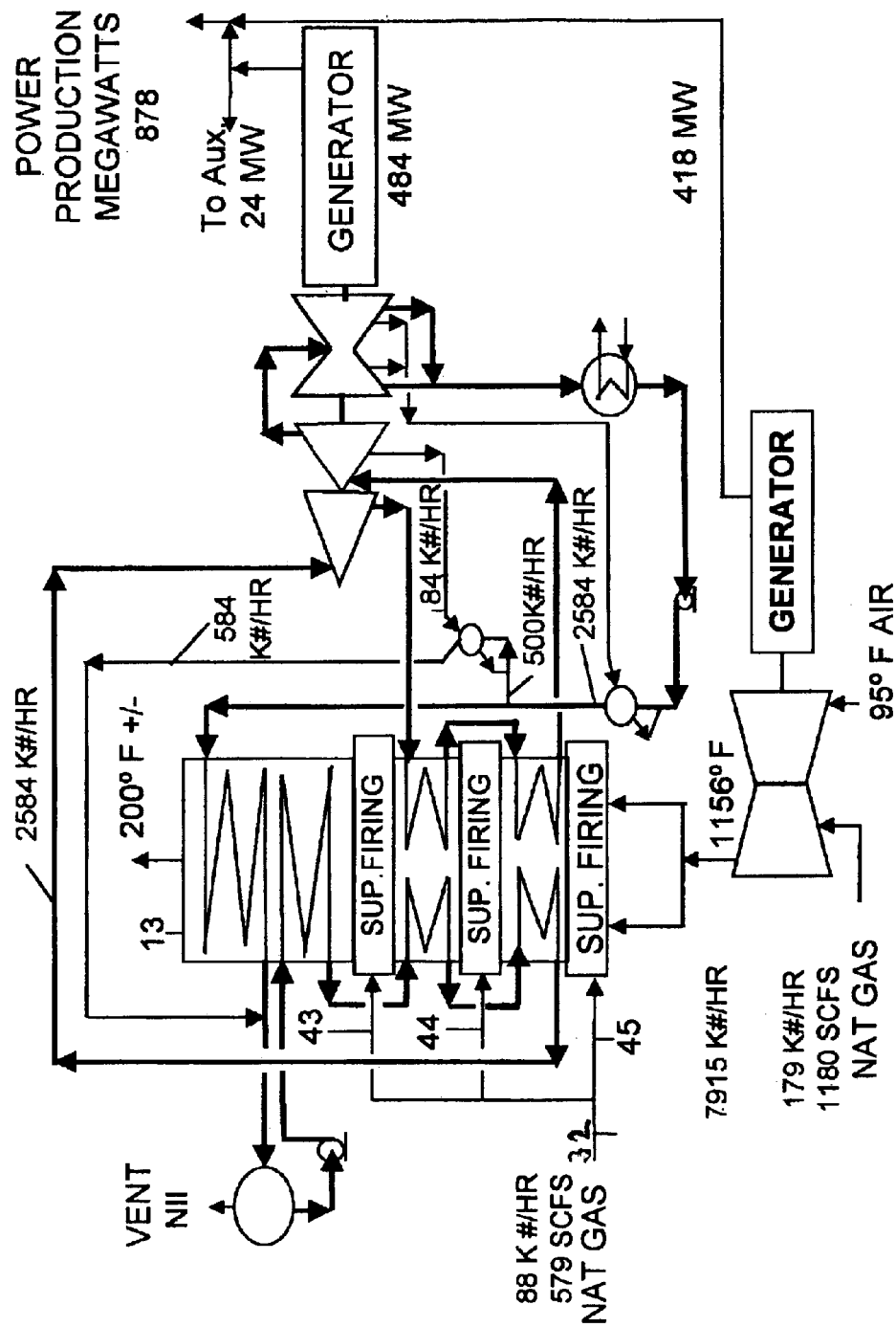
FIG. 9 is the a simplified flow diagram of an embodiment of the super critical combined cycle of FIG. 7 except that the fuel gas that is fired in the heat recovery unit is divided into three equal streams that are fired at three different points in the primary heat exchange section of the heat recovery unit.

The process of FIG. 9 is the process of FIG. 7 except that the 579 SCFS of fuel gas that is fired in the heat recovery unit 32 is divided into three equal streams 43 44 45 that are fired at three points in the primary heat exchange section 19 of the heat recovery unit 13. One third of the fuel is fired at the turbine gas entrance 45; one third of the supplementary fuel gas is fired a the zone where one third of the available sensible heat has been transferred to the working fluid 44; and the last third of the supplemental natural gas is fired at the point where two thirds of the available heat in the turbine gas has been transferred to the working fluid 43. This is one of many reasonable multiple supplementary firing configurations for the present invention that can be used to mitigate peak temperatures in the heat recovery unit when generating supplemental power.

Figure 10:
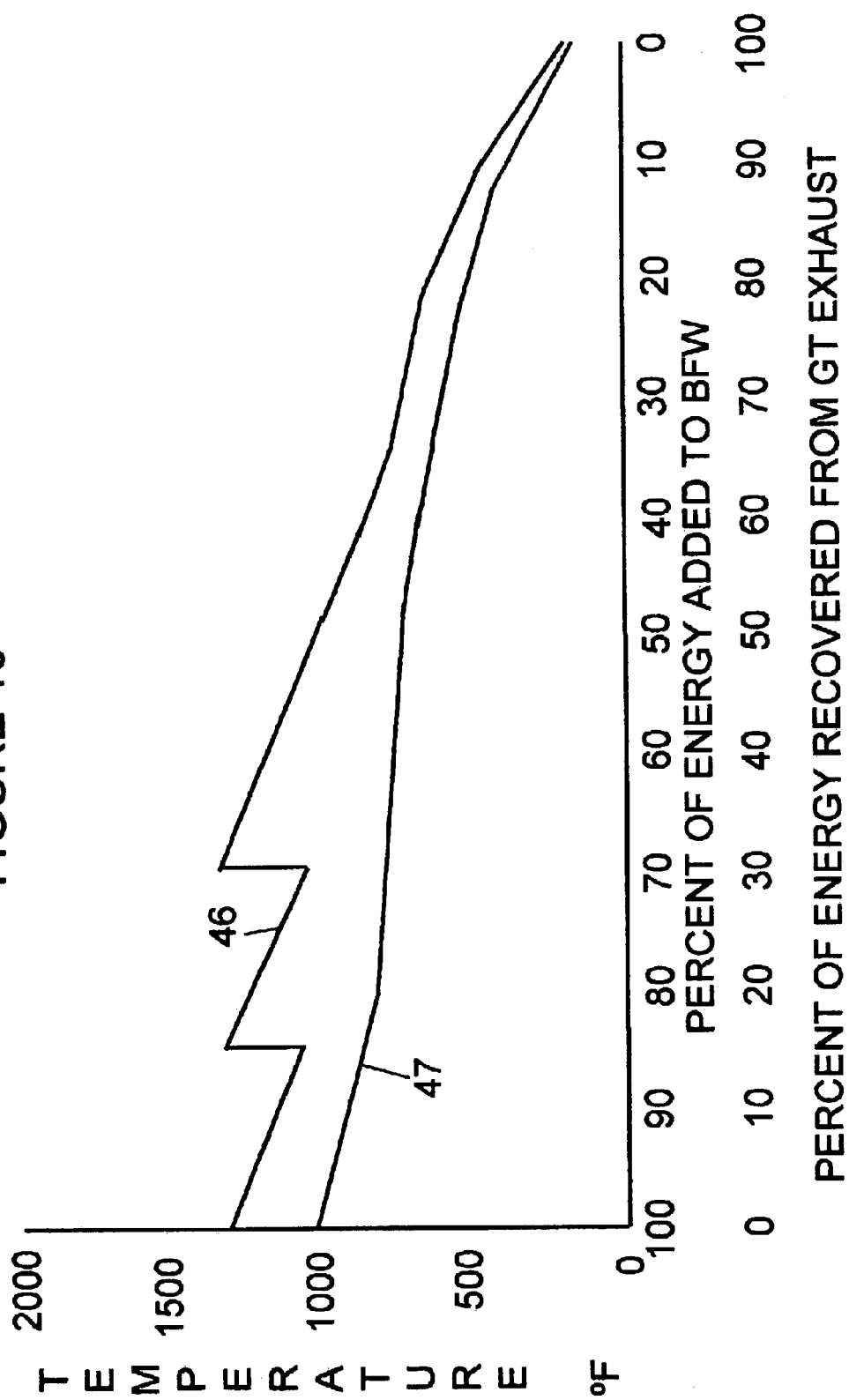
FIG. 10 presents the heating and cooling curves for the process of FIG. 9.

The effect of dividing the supplementary gas stream can be observed in the gas cooling curve and working fluid heating curve presented in FIG. 10. The peak temperatures reached in the gas stream 46 flowing through the heat recovery unit 13 of the process of FIG. 9 is 1400 F whereas the peak temperature in the process of FIG. 7 is almost 2000 F, near the gas entrance to heat recovery unit where the entire fuel gas stream is burned.

What is claimed is:

1. A combined cycle process for generating electric power that includes a steam turbine train, one or more gas turbines, and a heat recovery unit, the process comprising the steps of:
   a) condensing an exhaust steam stream emitted from the steam turbine train via an exit point near the downstream end of the steam turbine train to form a condensate stream, preheating the condensate stream in a preheater, conveying the preheated condensate into economizer tubes in the top section of the heat recovery unit and further heating the preheated condensate, then conveying the condensate stream to a de-aerating drum where a small vent gas stream is withdrawn from the condensate stream, withdrawing the de-aerated condensate stream from the de-aerating drum and compressing it to a pressure that is above the critical pressure of water (which is 3206.2 psia), conveying the compressed condensate stream to primary heating tubes in the heat recovery unit and heating the compressed de-aerated condensate stream to a temperature that is above the critical temperature of water (which is 705.4 F) to form a super critical water working fluid stream, and conveying the super critical water working fluid stream from the heat recovery unit into an entrance to the steam turbine train located near the upstream end of the steam turbine train;
   b) burning fuel gas in the one or more gas turbines each turbine driving and electric generator, and each producing a gas turbine exhaust gas stream, combining and conveying the gas turbine exhaust gas streams into the heat recovery unit, where the gas stream flows first over the primary heating tubes and then over the economizer tubes in the heat recovery unit transferring heat from the gas turbine exhaust gas stream to the condensate stream to raise the temperature of the condensate stream to a temperature that is above the critical temperature of water (which is 705.4 F) to form the super critical water working fluid stream that is conveyed into the steam turbine train.

2. The process of claim 1 wherein the steam turbine train also includes one or more side stream steam extraction outlets, and each side stream steam outlet has a corresponding reheated side steam side stream inlet on the steam turbine train that is downstream of the corresponding steam side stream outlet, and wherein the process comprises the additional steps of:
   a) extracting one or more steam side streams from the steam turbine train via the steam side stream outlets;

b) conveying the steam side streams to reheat tubes located in the heat recovery unit so that the gas turbine exhaust gas stream flows first over the reheat tubes and then over the economizer tubes to reheat steam side streams; and c) conveying the reheated steam side streams into the steam turbine each via the reheated steam side stream inlet corresponding to the side stream outlet.

3. The process of claim 2 wherein the heat recovery unit includes facilities for feeding, controlling, and firing fuel gas streams into the gas turbine exhaust gas stream in the heat recovery unit at one or more points in the heat recovery unit, and the process includes the added step of feeding, controlling, and burning streams of fuel gas in the gas turbine exhaust gas stream at one or more points in the heat recovery unit.

4. The process of claim 3 wherein one of the fuel gas feed points is near the gas turbine exhaust gas stream inlet to the heat recovery unit.

5. The process of claim 4 wherein all the fuel gas fired in the heat recovery unit is fed into the heat recovery unit at the feed point that is near the gas turbine exhaust gas stream inlet to the heat recovery unit.

6. A combined cycle process for generating electric power that includes 1) a steam turbine train that drives an electric generator, and the steam turbine train has an upstream end where water working fluid enters and a downstream end where exhaust steam is discharged, 2) one or more gas turbines each driving an electric generator and each producing a gas turbine exhaust gas stream, 3) a heat recovery unit that includes primary tubes, reheat tubes and economizer tubes, and 4) the steam turbine train includes one or more steam side stream outlets, and each steam side stream outlet has a corresponding reheated steam side stream inlet that is downstream of its corresponding steam side stream outlet, and 5) the heat recovery unit includes facilities for feeding, controlling, and firing fuel gas streams into the gas turbine exhaust gas stream in the heat recovery unit at one or more points in the heat recovery unit; wherein the process comprises the steps of:

a) firing fuel gas in the one or more gas turbines to drive the turbine generators and produce power, combining the gas turbine exhaust gas streams and conveying the combined gas turbine exhaust stream into the heat recovery unit via an inlet to the heat recovery unit where the gas stream flows first over the primary heating tubes and the reheat tubes and then over the economizer tubes;

b) condensing an exhaust steam stream emitted from the steam turbine train near the downstream end of the steam turbine train to form a condensate stream, pre-heating the condensate stream, dividing the pre-heated condensate stream into a first part condensate stream and a second part condensate stream, conveying the first part condensate stream into economizer heat exchange tubes in the heat recovery unit where the first part condensate stream is heated by the gas turbine exhaust gas stream flowing through the heat recovery unit first over the primary heating tubes and reheat tubes and then over the economizer tubes;

c) conveying the second part condensate stream to a bypass condensate preheater where the second part condensate stream is further heated using steam side streams extracted from the steam turbine train as the heat source;

d) conveying the first part condensate stream from the economizer tubes and the second condensate stream from the second condensate preheater to a de-aerator drum where a vapor stream is withdrawn from the condensate, and the de-aerated condensate stream is withdrawn from the flash drum and compressed to a pressure that is above the critical pressure of water (which is 3206.2 psia);

e) conveying the compressed condensate stream from the de-aerator drum to the primary heat exchange tubes in the heat recovery unit where the condensate stream is heated by the gas turbine exhaust gas stream flowing over the primary heating tubes through the heat recovery unit to a temperature that is above the critical temperature of water (which is 705.4 F) to form a super critical water working fluid stream;

f) conveying the super critical water working fluid stream from the heat recovery unit into an inlet on the steam turbine train located near the upstream end of the steam turbine train;

g) extracting one or more steam side streams from the steam turbine train using a steam side stream outlet for each side stream, conveying the steam side streams to reheat tubes in the heat recovery unit wherein the steam side streams are reheated by heat transferred from the gas turbine exhaust gas streams flowing over the reheat tubes, conveying the reheated steam side streams from the reheat tubes into the steam turbine train through the reheated steam side stream inlet corresponding the steam side stream outlet;

h) feeding, controlling and firing one or more fuel gas streams in the gas turbine exhaust gas streams in the heat recovery unit in proximity to the primary and reheat heat exchange tubes.

7. The process of claim 6 wherein the ratio of the mass flow rate of gas turbine exhaust gas flowing over the economizer heat exchange tubes to the mass flow rate of condensate flowing in the economizer heat exchange tubes in the heat recovery unit is maintained higher than about 4.3.

8. The process of claim 7 wherein the ratio of mass flow rate of gas turbine exhaust gas flowing over the economizer heat exchange tubes to mass flow rate of condensate flowing in the economizer heat exchange tubes is maintained at a specified ratio above about 4.3 by adjusting the rate of flow of the second condensate stream part that is diverted from the economizer tubes to the condensate preheater.

9. The process of claim 6 wherein the temperature of the super critical water working fluid stream that exits the heat recovery unit and is conveyed to the steam turbine train is maintained at a specified temperature that is above the critical temperature of water (which is 705.4 F) by adjusting the flow rates of the fuel gas streams that are fired in the heat recovery unit.

10. The process of claim 3 wherein the power generating capacity of the steam turbine generator train can be varied by a factor of ten.

* * * * *